(12) United States Patent
Cheng et al.

(10) Patent No.: US 9,846,416 B2
(45) Date of Patent: Dec. 19, 2017

(54) SYSTEM AND FLOW ADAPTIVE SENSORLESS PUMPING CONTROL APPARATUS FOR ENERGY SAVING PUMPING APPLICATIONS

(71) Applicant: Fluid Handling LLC., Morton Grove, IL (US)

(72) Inventors: Andrew A. Cheng, Wilmette, IL (US); James J. Gu, Buffalo Grove, IL (US); Graham A. Scott, Prospect Heights, IL (US)

(73) Assignee: Fluid Handling LLC, Morton Grove, IL (US)

( * ) Notice: Subject to any disclaimer, the term of this patent is extended or adjusted under 35 U.S.C. 154(b) by 0 days.

(21) Appl. No.: 14/730,871

(22) Filed: Jun. 4, 2015

(65) Prior Publication Data
US 2016/0017889 A1 Jan. 21, 2016

Related U.S. Application Data

(60) Provisional application No. 62/007,474, filed on Jun. 4, 2014.

(51) Int. Cl.
| | | |
|---|---|---|
| *G05B 13/04* | (2006.01) | |
| *F24F 11/00* | (2006.01) | |
| *F04D 15/00* | (2006.01) | |

(52) U.S. Cl.
CPC ....... *G05B 13/041* (2013.01); *F04D 15/0072* (2013.01); *F24F 11/008* (2013.01)

(58) Field of Classification Search
CPC ....... F24F 11/008; F24F 11/06; G05B 13/041; F04D 15/0072; F04D 27/00; F24D 19/1012
See application file for complete search history.

(56) References Cited

U.S. PATENT DOCUMENTS

| | | | |
|---|---|---|---|
| 5,651,264 A | 7/1997 | Lo et al. | |
| 6,234,759 B1 * | 5/2001 | Hennel | F04B 49/20 417/44.1 |

(Continued)

OTHER PUBLICATIONS

Vorholt, K., "Tennessee Tech Saves by Utilizing Energy Efficiency" tekworx.us; May 20, 2014, http://web.tekworx.us/blognTag=hydronic+system.

(Continued)

*Primary Examiner* — Miranda Huang
*Assistant Examiner* — John Park
(74) *Attorney, Agent, or Firm* — Ware, Fressola, Maguire & Barber LLP (57) ABSTRACT

A signal processor receives signaling containing information about flow rates from sensorless converters in zone circulators in heating/cooling zones controlled by temperature sensors in a hydronic heating system in order to derive an adaptive pressure set point to meet the flow rates requested by the heating/cooling zones using an adaptive system and flow control curve equation, the signaling containing information about total flow rates requested by the zone circulators; determines desired pump speeds for the zone circulators to meet temperature requirements in heat zones; provides corresponding signaling containing information about the desired pump speeds; and/or determines the adaptive pump control curve equation based upon an adaptive system curve and as a moving maximum system flow rate depending on an adaptive pressure set point, a system flow rate requested by temperature loads, a minimum pressure at no flow, a control curve setting parameter, and an adaptive moving maximum flow and pressure.

19 Claims, 2 Drawing Sheets

A system and flow adaptive pumping control scheme for a hydronic pumping system.

(56) References Cited

U.S. PATENT DOCUMENTS

| | | |
|---|---|---|
| 6,663,349 B1 | 12/2003 | Discenzo et al. |
| 7,130,721 B2 | 10/2006 | Wear et al. |
| 7,284,710 B2 | 10/2007 | Rixen et al. |
| 7,949,483 B2 | 5/2011 | Discenzo et al. |
| 8,046,107 B2 | 10/2011 | Zugibe et al. |
| 8,425,200 B2 | 4/2013 | Tran et al. |
| 8,700,221 B2 | 4/2014 | Cheng et al. |
| 2006/0276999 A1 | 12/2006 | Beck et al. |
| 2007/0212210 A1 | 9/2007 | Kernan et al. |
| 2008/0288115 A1 | 11/2008 | Rusnak et al. |
| 2009/0129941 A1 | 5/2009 | Haas |
| 2011/0081255 A1 | 4/2011 | Steger et al. |
| 2012/0173027 A1 | 7/2012 | Cheng et al. |
| 2012/0251340 A1 | 10/2012 | Ahonen et al. |
| 2014/0005841 A1* | 1/2014 | Cheng .................. G05D 7/0617 700/282 |
| 2014/0048244 A1 | 2/2014 | Wallace |

OTHER PUBLICATIONS

Wang, Shengwei, and John Burnett, "Online adaptive control for optimizing variable-speed pumps of indirect water-cooled chilling systems," Applied Thermal Engineering 21.11, 2001 (pp. 1083-1103). http://www.sciencedirect.com/science/article/pii/S1359431100001095.

Haissig, C., "Adaptive fuzzy temperature control for hydronic heating systems," Control Systems, IEEE , vol. 20, No.2, Apr. 2000 (pp. 39, 48). http://ieeexplore.ieee.org/xpl/articleDetails.jsp?arnumber=833639.

Gad-el-Hak, Mohamed. "Modern developments in flow control," Applied Mechanics Reviews 49.7, 1996 (pp. 365-379). http://appliedmechanicsreviews.asmedigitalcollection.asme.org/article.aspx?articleid=1395712.

* cited by examiner

FIG. 1: A conventional hydronic (PRIOR ART) pumping heating system

FIG. 2: A system and flow adaptive pumping control scheme for a hydronic pumping system.

FIG. 3: Schematic of an energy saving sensorless pumping control configuration

---

Apparatus 10

Signal processor or processing module 10a
configured at least to:

receive signaling containing information about flow rates from sensorless converters in zone circulators in heating/cooling zones controlled by temperature sensors in a hydronic heating system in order to derive an adaptive pressure set point to meet flow rates requested by the heating/cooling zones using an adaptive system and flow control curve equation, the signaling received also containing information about total flow rates requested by the zone circulators;

determine desired pump speeds for the zone circulators to meet temperature requirements in heat zones, based upon the signaling received; and/or     provide corresponding signaling containing information about the desired pump speeds for the zone circulators.

---

Other signal processor circuits or components 10b that do not form part of the underlying invention, e.g., including input/output modules, one or more memory modules, data, address and control busing architecture, etc.

FIG. 4

SYSTEM AND FLOW ADAPTIVE SENSORLESS PUMPING CONTROL APPARATUS FOR ENERGY SAVING PUMPING APPLICATIONS

CROSS REFERENCE TO RELATED APPLICATION

This application claims benefit to U.S. provisional application No. 62/007,474, filed 4 Jun. 2014, entitled "System and Flow Adaptive Pumping Control Apparatus—A Minimum Pumping Energy Operation Control System vs. Sensorless Application," which is hereby incorporated by reference in its entirety.

This application is also related to a family of technologies developed by one or more of the inventors herein, and disclosed in the following applications:

[1] U.S. application Ser. No. 12/982,286, filed 30 Dec. 2010, entitled "Method and apparatus for pump control using varying equivalent system characteristic curve, AKA an adaptive control curve," which issued as U.S. Pat. No. 8,700,221 on 15 Apr. 2014;

[2] U.S. application Ser. No. 13/717,086, filed 17 Dec. 2012, entitled "Dynamic linear control methods and apparatus for variable speed pump control," which claims benefit to U.S. provisional application No. 61/576,737, filed 16 Dec. 2011, now abandoned;

[3] U.S. application Ser. No. 14/091,795, filed 27 Nov. 2013, entitled "3D sensorless conversion method and apparatus," which claims benefit to U.S. provisional application No. 61/771,375, filed 1 Mar. 2013, now abandoned;

[4] U.S. application Ser. No. 14/187,817, filed 24 Feb. 2014, entitled "A Mixed Theoretical And Discrete Sensorless Converter For Pump Differential Pressure And Flow Monitoring," which claims benefit to U.S. provisional application No. 61/803,258, filed 19 Mar. 2013, now abandoned;

[5] U.S. application Ser. No. 14/339,594, filed 24 Jul. 2014, entitled "Sensorless Adaptive Pump Control with Self-Calibration Apparatus for Hydronic Pumping System," which claims benefit to U.S. provisional application Ser. No. 14/339,594, filed 24 Jul. 2014; and

[6] U.S. application Ser. No. 14/680,667, filed 7 Apr. 2015, entitled "A Best-fit affinity sensorless conversion means for pump differential pressure and flow monitoring," which claims benefit to provisional patent application Ser. No. 61/976,749, filed 8 Apr. 2014, which are all assigned to the assignee of the instant patent application, and all incorporated by reference in their entirety.

The present invention builds on the family of technologies disclosed in the aforementioned related applications.

BACKGROUND OF THE INVENTION

1. Field of the Invention

The present invention relates to a technique for controlling the operation of a pump and pumping system; and more particularly, the present invention relates to a method and apparatus for controlling and/or monitoring a pump, e.g., including for domestic and commercial heating or cooling water systems.

2. Brief Description of Related Art

Figure 1:
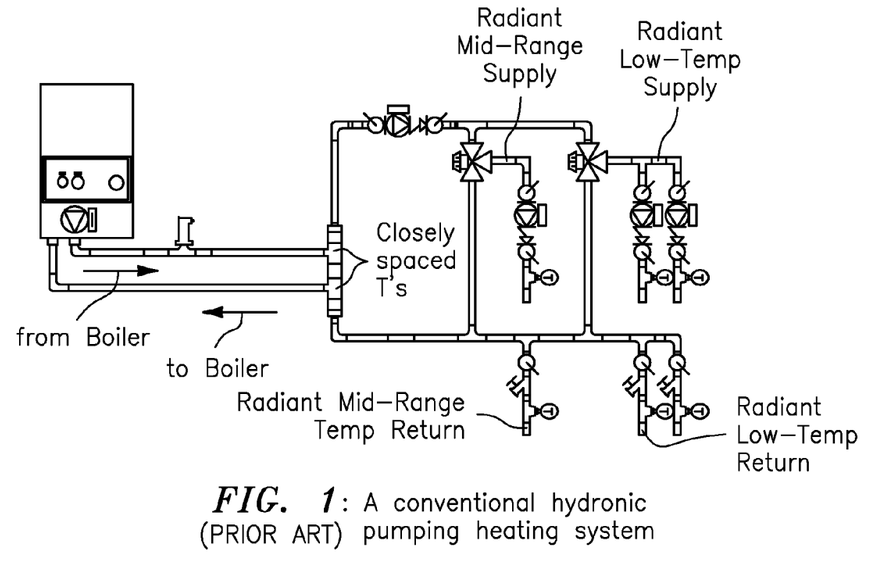
FIG. 1 is a schematic diagram of a hydronic sensorless pumping control system that is known in the art, which may be suitably adapted and reconfigured, e.g., based upon some embodiments of the present invention.

FIG. 1 shows schematically a conventional constant pumping hydronic heating system, where hot water supplied from a boiler by a primary pump is transferred to heating zones by a secondary pump and circulated through zones by circulators respectively. A three way valve controlled by a temperature sensor detours incoming water partially into heating zones to maintain the flow rate requested for the temperature setup at zones and bypasses the rest of the incoming water into bypass pipelines, respectively. Following this configuration, there is significant energy waste in the system, including the energy loss due to flow dynamic friction through the bypass pipelines and valves, as well as the water thermal energy loss in bypass lines.

Recently, variable speed pump controls with energy saving control means or techniques, such as a linear curve control or a quadratic curve control, were disclosed for hydronic pumping control applications. However, the amount of energy that might be saved by these energy saving control means or techniques is mostly dependent on the control parameters set up, for instance, system design values on pressure and flow rate which are unknown in general to an operator due to the complexity of a hydronic system in service. In addition, the flow rate in the system may vary from time to time depending on the temperature settings and weather conditions outside as well.

In view of this, there is a need in the industry for an energy saving control means or technique, e.g., which is not only adaptive to the system curve, but to the flow rate associated with as well, so that pumping energy may be saved optimally.

SUMMARY OF THE INVENTION

In summary, the present invention provides a new and unique system and flow adaptive control means or technique for a hydronic pumping heating or cooling system is disclosed herein. In summary, a control curve in the system and flow adaptive control means or technique may be setup adaptively with respect to system characteristics curve as well as a moving maximum flow rate. In operation, the pressure set point with the system and flow adaptive control curve for pump speed PID (i.e., Proportional/Integral/Derivative) control is understood to be much closer to the system pressure needed to provide the flow rate requested in system. A minimum pumping energy operation control system is also disclosed as well based on the system and flow adaptive control means or technique together with sensorless applications.

The instant application provides a technique that is a further development of, and builds upon, the aforementioned family of technologies set forth above.

PARTICULAR EMBODIMENTS

According to some embodiments, the present invention may include, or take the form of, apparatus featuring a signal processor or processing module configured at least to:

receive signaling containing information about flow rates from sensorless converters in zone circulators in heating/cooling zones controlled by temperature sensors in a hydronic heating system in order to derive an adaptive pressure set point to meet the flow rates requested by the heating/cooling zones using an adaptive system and flow control curve equation, the signaling received also containing information about total flow rates requested by the zone circulators; and determine desired pump speeds for the zone circulators to meet temperature requirements in heat zones, based upon the signaling received.

According to some embodiments, the present invention may include one or more of the following features:

The signal processor or processing module may be configured to provide corresponding signaling containing information about the desired pump speeds.

The corresponding signaling may contain information used to control a pumping hydronic system.

The signal processor or processing module may be configured in, or form part of, a central pump control panel.

The zone circulators may include sensors for providing the flow rates, and the apparatus may also include the sensors.

The signal processor or processing module may be configured to determine the adaptive pump control curve equation based upon an adaptive system curve and as a moving maximum system flow rate, e.g., that depends on a relationship between an adaptive pressure set point, a system flow rate requested by temperature loads, a minimum pressure at no flow, a control curve setting parameter, and an adaptive moving maximum flow and pressure.

In operation, and by way of example, the signal processor or processing module may be configured to:

1) determine the adaptive pump control curve equation based upon the adaptive system curve and as the moving maximum system flow rate using an equation (2.1), as follows:

$$P^*(t) = \left(\frac{Q^*(t)}{\overline{Q}_m(t)}\right)^\alpha (\overline{P}_m(t) - b_0) + b_0, \quad (2.1)$$

where $P^*(t)$ represents the adaptive pressure set point, $Q^*(t)$ is the system flow rate requested by the temperature loads, $b_0$ is the minimum pressure at no flow, $\alpha$ is the control curve setting parameter varying as $1 \leq \alpha \leq 2$ defined in between a linear curve and a quadratic one, and $\overline{Q}_m(t)$ and $\overline{P}_m(t)$ are the adaptive moving maximum flow and pressure; or 2) determine a flow signal for use in a flow PID control technique based upon a flow set point in a control function using an equation (2.2), as follows:

$$Q^*(t) = \left(\frac{P^*(t) - b_0}{P_0 - b_0}\right)^{-\alpha} \overline{Q}_m(t), \quad (2.2)$$

including where the signal processor or processing module is configured to receive the instant pressure signal of $P^*(t)$ from a pressure sensor.

The signal processor or processing module may be configured to receive associated signaling containing information about the system flow rate of $Q^*(t)$ or the pressure of $P^*(t)$ from a flow meter or the pressure sensor, or a sensorless converter, respectively.

For a multiple zones application, the signal processor or processing module may be configured to determine the system flow rate of $Q^*(t)$ as a summation of zone flow rates, respectively, using an equation (2.3), as follows:

$$Q^*(t) = \sum_{i=1}^{n} Q_i^*(t), \quad (2.3)$$

where $Q_i^*(t)$ is a flow rate at zone i, and n is a total numbers of zones, including where the signal processor or processing module is configured to receive the associated signaling containing information about the system flow rate of $Q_i^*(t)$ or the pressure of $P^*(t)$ from a flow meter or the pressure sensor, or a sensorless converter in zone i, respectively.

The signal processor or processing module may be configured to determine associated signaling related to the adaptive moving maximum flow of $\overline{Q}_m$ by a moving average or a moving peak detector upon the system flow of Q using an equation (2.4), as follows:

$$\overline{Q}_m(t) = \begin{cases} MA(Q(t)) \vee MP(Q(t)), & Q < \overline{Q}_m \\ Q(t), & Q \geq \overline{Q}_m \end{cases}, \quad (2.4)$$

where the function $MA(Q(t))$ represents a moving average detector and the function $MP(Q(t))$ represents a moving peak detector respectively.

The signal processor or processing module may be configured to determine associated signaling containing information about $\overline{P}_m(t)$ by using a flow equation, as follows:

$$\overline{P}_m = (\overline{Q}_m/\overline{C}_v)^2,$$

including where the signal processor or processing module is configured to determine the associated signaling containing information about an adaptive system characteristics coefficient of $\overline{C}_v$ using equivalent system characteristics coefficient of $C_v$ by using the moving average or maximum detector defined in the equation (2.4) accordingly.

The parameters $\overline{Q}_m$ and $\overline{P}_m$ may vary within ranges of $0 < \overline{Q}_m < \overline{Q}_d$ and $b_0 < \overline{P}_m < \overline{P}_d$, including where the adaptive system characteristics coefficient of $\overline{C}_v$ may be a constant value of $C_v$, e.g., if the system flow is regulated by circulators.

The signal processor or processing module may be configured to determine associated signaling containing information about a design point or duty point of the system flow and pressure of $\overline{Q}_d$ and $\overline{P}_d$, where the system curve may run through a pump curve at a speed designed, using equations (2.5), as follows:

$$\begin{cases} \overline{Q}_d(n_d, \overline{C}_v) = \frac{n_d}{2n_{max}}\left(-b \pm \sqrt{b^2 - 4c(a - \overline{C}_v^{-2})}\right) / (a - \overline{C}_v^{-2}) \\ \overline{P}_d(n_d, \overline{C}_v)\left(\frac{\overline{Q}_d}{\overline{C}_v}\right)^2 \end{cases}, \quad (2.5)$$

where a, b and c are coefficients of a second order best-fit pump curve function, $n_d$ and $n_{max}$ are pump speeds at the design point and an associated maximum respectively.

The signal processor or processing module may be configured to determine associated signaling containing information about a PID function for motor speed of n with respect to an instant system pressure and the adaptive pressure set point using an equation (3.1), as follows:

$$n(t) = pid(P^*(t), P(t)), \quad (3.1)$$

where $P^*(t)$ is the adaptive pressure set point defined by the equation (2.1), $P(t)$ is an instant system pressure, and pid represents a PID control function.

The signal processor or processing module may be configured to determine associated signaling for a flow follower PID control to achieve a minimum pumping energy operation using an equation (3.2), as follows:

$$n(t) = \text{pid}(Q^*(t), Q(t)), \quad (3.2)$$

where Q*(t) is the system flow set point determined using equation (2.2) with an instant system pressure signal or determined directly for the multiple zones flow signals using equation (2.3), respectively, Q(t) is the instant system flow rate at motor speed of n.

The apparatus may include, or take the form of, system and flow adaptive sensorless pumping control apparatus.

The apparatus may include, or take the form of, a pump control or controller, including a PID control, having the signal processor or signal processor module, e.g., including for a hydronic heating system.

By way of example, the signal processor or processing module may include, or take the form of, at least one signal processor and at least one memory including computer program code, and the at least one memory and computer program code are configured to, with at least one signal processor, to cause the signal processor at least to receive the signaling (or, for example, the associated signaling) and determine the desired pump speeds for the zone circulators. The signal processor or processing module may be configured with suitable computer program code in order to implement suitable signal processing algorithms and/or functionality, consistent with that set forth herein.

According to some embodiments, the present invention may also take the form of a method including steps for:

receiving in a signal processor or processing module signaling containing information about flow rates from sensorless converters in zone circulators in heating/cooling zones controlled by temperature sensors in a hydronic heating system in order to derive an adaptive pressure set point to meet the flow rates requested by the heating/cooling zones using an adaptive system and flow control curve equation, the signaling received also containing information about total flow rates requested by the zone circulators; and determining in the signal processor or processing module desired pump speeds for the zone circulators to meet temperature requirements in heat zones, based upon the signaling received.

The method may also include one or more of the features set forth herein, including providing from the signal processor or processing module corresponding signaling containing information about the desired pump speeds for the zone circulators, e.g., which may be used to control a hydronic pumping system.

The present invention may also, e.g., take the form of a computer program product having a computer readable medium with a computer executable code embedded therein for implementing the method, e.g., when run on a signal processing device that forms part of such a pump controller. By way of example, the computer program product may, e.g., take the form of a CD, a floppy disk, a memory stick, a memory card, as well as other types or kind of memory devices that may store such a computer executable code on such a computer readable medium either now known or later developed in the future.

By following and taking advantage of approaches disclosed in the aforementioned references [1] and [2] set forth above, the inventors provide a new and unique system and flow adaptive control means or technique for a hydronic pumping heating or cooling system herein. The control curve provided herein may be adaptive not only to a system curve, but a moving maximum flow rate as well. The pressure set point with the system and flow adaptive control curve is effectively much closer to the system pressure needed to provide the flow rate requested in the system. A minimum pumping energy operation control system setup may be provided herein as well based on the system and flow adaptive control means together with sensorless applications disclosed in aforementioned references [3], [4], [5] and [6] set forth above. This new and unique system and flow adaptive control means or technique for a hydronic pumping heating or cooling system provides an energy saving control means or technique which is not only adaptive to the system curve, but to flow rate associated with it as well, so that the pumping energy may be saved optimally, thereby solving a problem in the industry and providing an important contribution to the overall state of the art, especially when implemented in such a hydronic pumping heating or cooling system.

BRIEF DESCRIPTION OF THE DRAWING

The drawing includes the following Figures, which are not necessarily drawn to scale.

DETAILED DESCRIPTION OF THE INVENTION

Figure 2:
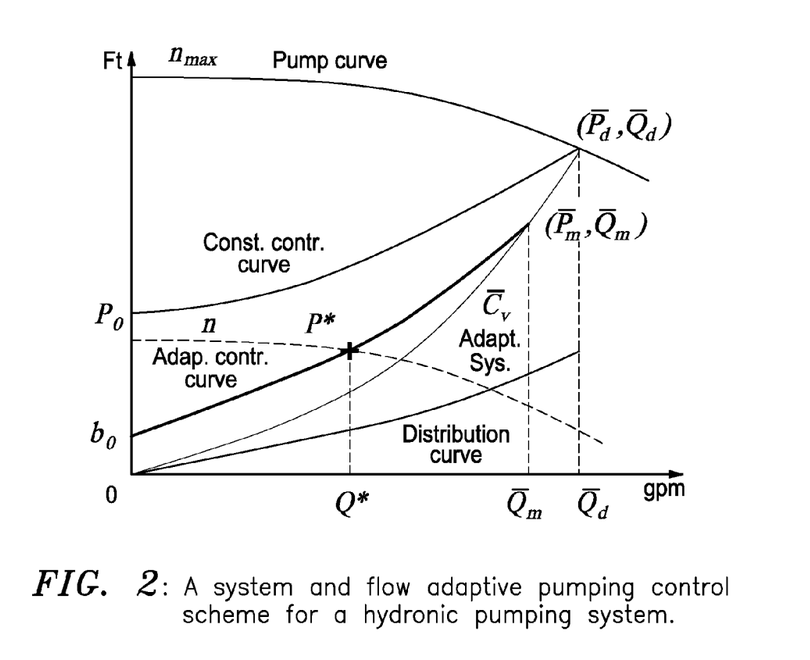
FIG. 2 is a graph of pressure (Ft) in relation to flow (GPM) showing pump, system and power characteristics curves and a pressure equilibrium point at a steady state, according to implementation of some embodiments of the present invention.

FIG. 2: System and Flow Adaptive Pumping Control Functions

FIG. 2 shows a graph that includes a pump curve, a constructive control curve, an adaptive control curve, an adaptive system curve, and a distribution curve, e.g., for implementing a system and flow adaptive pumping control scheme for a hydronic pumping system according to some embodiments of the present invention. By way of example, for a pumping control application where the instant system flow rate and pressure are available, the system and flow adaptive pump control curve equation may be derived, e.g., based upon the adaptive system curve as well as a moving maximum system flow rate in form of, or by using equation (2.1), as follows:

$$P^*(t) = \left(\frac{Q^*(t)}{\overline{Q}_m(t)}\right)^\alpha (\overline{P}_m(t) - b_0) + b_0, \quad (2.1)$$

where P* represents the adaptive pressure set point, Q* is the system flow rate requested specifically by temperature loads, $b_0$ is the minimum pressure at no flow, α is a control curve setting parameter varying as 1≤α≤2 defined in between a linear curve and a quadratic one, and $\overline{Q}_m$ and $\overline{P}_m$ are the adaptive moving maximum flow and pressure as shown in FIG. 2, respectively. By way of example, equation (2.1) may be suitably named as a system and flow adaptive control function.

By way of further example, in case that a flow signal may be used in a flow PID control, the flow set point in the control function may then be rewritten in form of, or by using equation (2.2), as follows:

$$Q^*(t) = \left(\frac{P^*(t) - b_0}{P_0 - b_0}\right)^{-\alpha} \overline{Q}_m(t). \quad (2.2)$$

Here, a pressure sensor may be used to obtain the instant pressure signal of $P^*$.

In Eq. (2.1) or (2.2), the system flow rate of $Q^*$ or pressure of $P^*$ requested may be provided by a flow meter or a pressure sensor, or a sensorless converter, respectively.

By way of example, for a multiple zones application, the system flow rate of $Q^*$ requested may be expressed as the summation of zone flow rates respectively, or by using equation (2.2), as follows:

$$Q^*(t) = \sum_{i=1}^{n} Q_i^*(t), \quad (2.3)$$

where $Q^*_i$ the flow rate at zone i and n is the total numbers of zones, which is again may be provided by a flow meter or a pressure sensor, or a sensorless converter in zone i, respectively.

In general, and by way of example, the adaptive moving maximum flow of $\overline{Q}_m$ can be obtained by a moving average or a moving peak detector upon the system flow of Q as $$\overline{Q}_m(t) = \begin{cases} MA(Q(t)) \vee MP(Q(t)), & Q < \overline{Q}_m \\ Q(t), & Q \geq \overline{Q}_m \end{cases}, \quad (2.4)$$

where MA represents a moving average detector and MP represents a moving peak detector respectively. $\overline{P}_m$ may be obtained by the flow equation of $\overline{P}_m = (\overline{Q}_m/\overline{C}_v)^2$. The adaptive system characteristics coefficient of $\overline{C}_v$ may be obtained similarly from the equivalent system characteristics coefficient of $C_v$ by using the moving average or maximum detector defined in Eq. 2.4 accordingly. $\overline{Q}_m$ and $\overline{P}_m$ may vary within $0 < \overline{Q}_m < \overline{Q}_d$ and $b_0 < \overline{P}_m < \overline{P}_d$ which are shown in FIG. 2. Note that the adaptive system characteristics coefficient of $\overline{C}_v$ may be a constant value of $C_v$, e.g., if system flow is regulated by circulators.

By way of example, the design point or duty point of system flow and pressure of $\overline{Q}_d$ and $\overline{P}_d$, where the system curve may run through a pump curve at a speed designed, can be obtained by following the approach in the aforementioned reference no. [6] as, or by using equation (2.5), as follows:

$$\begin{cases} \overline{Q}_d(n_d, \overline{C}_v) = \frac{n_d}{2n_{max}}\left(-b \pm \sqrt{b^2 - 4c\left(a - \overline{C}_v^{-2}\right)}\right) / \left(a - \overline{C}_v^{-2}\right) \\ \overline{P}_d(n_d, \overline{C}_v) = \left(\frac{\overline{Q}_d}{\overline{C}_v}\right)^2 \end{cases} \quad (2.5)$$

where a, b and c are the coefficients of a second order best-fit pump curve function, $n_d$ and $n_{max}$ are pump speeds at design point and its maximum respectively. It is noted that when $b_0$ is set to be zero and control curve coefficient of $\alpha$ is set to be quadratic curve of 2, the control curve is then overlapped with the system curve.

In comparison with other pressure control set point algorithms, means or technique, which have a fixed control curve defined by $(b_0, 0)$ and $(P_d, Q_d)$, the control equations in Eqs. 2.1 or 2.2 are adaptive not only to system characteristics variation but to the moving maximum flow rate associated with as well. The pressure set point values with the system and flow adaptive control curve for a PID motor speed control may be, therefore, much closer to the system characteristics curve. Under that, the pump operation energy and cost for a hydronic heating or cooling pumping system may be saved significantly.

Figure 3:
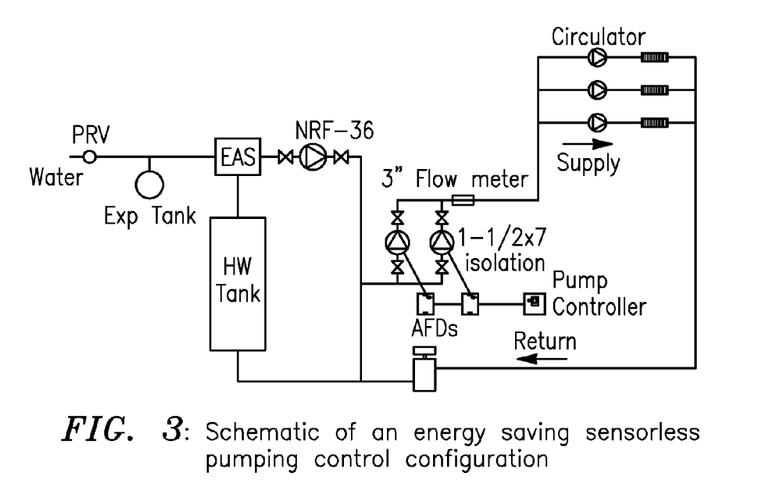
FIG. 3 is a schematic of an energy saving sensorless pumping control configuration, according to implementation of some embodiments of the present invention.

FIG. 3: Energy Saving Sensorless Pumping Control Configurations

Following the adaptive system and flow control concepts and methods disclosed above, energy saving sensorless pumping control configurations may be provided for a sensorless pumping control configuration as shown schematically in FIG. 3. As shown, and by way of example, the sensorless pumping control configuration may include a first pumping configuration having a hot water tank (HW tank or boiler), an EAS device and a pump (e.g., an NRF-36 pump) and associated valves (e.g., isolation valves), in combination with a second pumping configuration having pumps, other associated valves (e.g., other isolation valves), a flow meter, circulators, and a pump controller connected to the pumps via AFDs.

For example, three way valves associated with its bypass pipelines in the conventional constant pumping hydronic heating system in FIG. 1 may be removed completely from the zones. The total flow generated in the zones through circulators may then be correlated directly to the flow supplied by secondary loop pumps. There would be substantially no unnecessary energy waste in zones, i.e., no energy loss due to flow dynamic friction through bypass pipelines and three way valves. There is also no hot water thermal energy loss in bypass lines as well. Moreover, the adaptive system and flow control means or technique disclosed herein may be incorporated optimally with this minimum pumping energy operation configuration presented here.

According to the present invention, the control system operation may be implemented as follows. First, the desired flow rates to meet the temperature requirements in zones may be generated by zone circulators controlled by temperature sensors, respectively. The flow rates signals from the circulator's sensorless converters may then be transmitted to the central pump control panel, through a wire, a wireless or a communication protocol means accordingly. The adaptive pressure set point to meet the flow rates requested by zones may then be set up with the adaptive system and flow control curve equation defined in Eq. 2.1. The pump speed desired for the total flow rate in secondary loop may then be obtained through a PID control accordingly with respect to the instant system pressure and the adaptive pressure set point derived.

The PID function for motor speed of n with respect to the instant system pressure and the adaptive pressure set point mentioned above may be presented as $$n(t) = \text{pid}(P^*(t), P(t)), \quad (3.1)$$

where P* is the adaptive pressure set point defined by Eq. 2.1, P is the instant system pressure, and pid represents a PID control. As discussed previously, the adaptive system and flow control curve defined by Eq. 2.1 is actually coincided with the system curve exactly, if $b_0$ is set to be zero and the control curve coefficient of α is set to be the quadratic curve of 2. The adaptive pressure set point set up is then the same to the system pressure needed to meet the flow rate requirement by zones. The minimum pumping energy operation may be achieved accordingly.

In particular, a flow follower PID control may be introduced as well to achieve the minimum pumping energy operation the same as the adaptive pressure set point PID control presented above. The flow follower PID control disclosed herein may be expressed as, e.g., using the equation (3.2), as follows:

$$n(t)=\mathrm{pid}(Q^*(t),Q(t)), \quad (3.2)$$

where Q* is the system flow set point defined by Eq. 2.2 with an instant system pressure signal or derived directly for the multiple zones flow signals by Eq. 2.3, respectively, Q is the instant system flow rate at motor speed of n. Equation 3.2 defines a flow follower PID pump speed control, in which the system flow rate follows the total flow rate requested to meet the heating or cooling requirement at zones, respectively. Equations 2.1 through 2.5 defined in the previous description above may then be used to provide the instant pressure and flow at a steady state of the pumping system as well as the design pressure values as well.

For the flow rate regulated by circulators as shown in FIG. 3, either Eq. 3.1 or Eq. 3.2 may be used to achieve desired pump speed based upon the adaptive set point to meet the temperature requirement in zones, as long as the total flow rate requested by circulators is provided. The minimum pumping energy operation may then be realized accordingly. It has to be noted that the system and flow adaptive pumping control means may be fulfilled again by a flow meter or a pressure sensor, or a sensorless converter as well, respectively.

Figure 4:
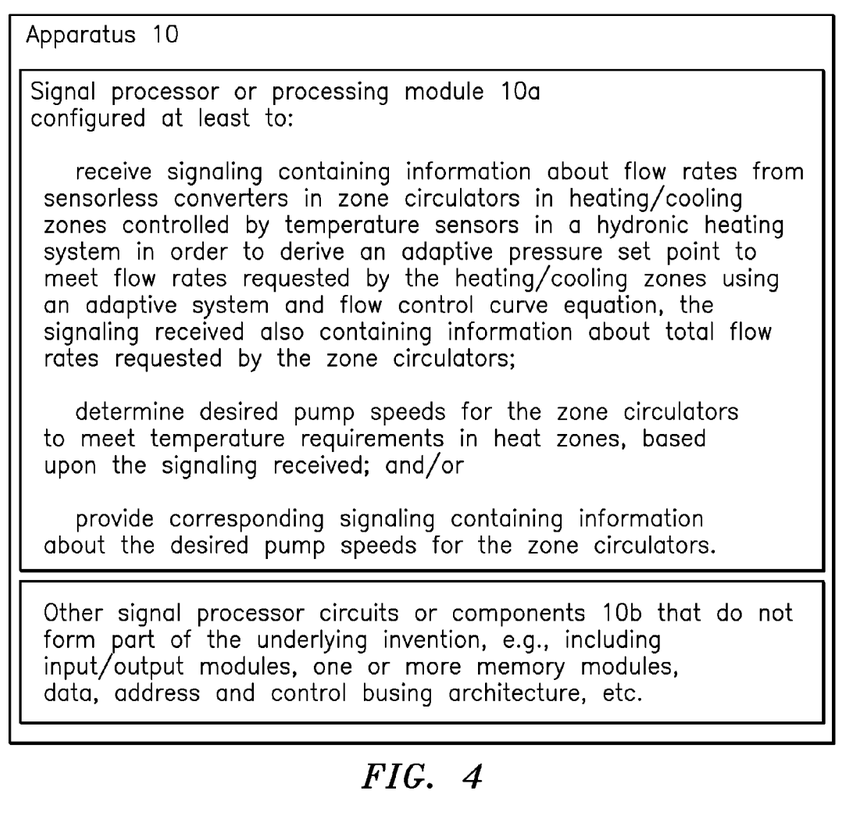
FIG. 4 is a block diagram of apparatus, e.g., having a signal processor or processing module configured for implementing the signal processing functionality, according to some embodiments of the present invention.

FIG. 4

By way of example, FIG. 4 shows apparatus 10 according to some embodiments of the present invention, e.g., featuring a signal processor or processing module 10a configured at least to:
  receive signaling containing information about flow rates from sensorless converters in zone circulators in heating/cooling zones controlled by temperature sensors in a hydronic heating system in order to derive an adaptive pressure set point to meet the flow rates requested by the heating/cooling zones using an adaptive system and flow control curve equation, the signaling received also containing information about total flow rates requested by the zone circulators; and
  determine desired pump speeds for the zone circulators to meet temperature requirements in heat zones, based upon the signaling received.

In operation, the signal processor or processing module may be configured to provide corresponding signaling containing information about the desired pump speeds. The corresponding signaling may contain information used to control a pumping hydronic system.

The signal processor or processing module may be configured in, or form part of, a central pump control panel, e.g., which may include or be implemented in conjunction with the control or controller shown in FIG. 3.

The zone circulators in FIG. 3 may include sensors for providing the flow rates.

As a person skilled in the art would appreciate and understand, the present invention may be implemented using pump and system characteristics equations and empirical power equations, e.g., consistent with that set forth herein, as well as by using other types or kinds of pump and system characteristics equations and empirical power equations that are either now known or later developed in the future.

By way of example, the functionality of the apparatus 10 may be implemented using hardware, software, firmware, or a combination thereof. In a typical software implementation, the apparatus 10 would include one or more microprocessor-based architectures having, e.g., at least one signal processor or microprocessor like element 10a. A person skilled in the art would be able to program such a microcontroller-based, or microprocessor-based, implementation to perform the functionality described herein without undue experimentation. For example, the signal processor or processing module 10a may be configured, e.g., by a person skilled in the art without undue experimentation, to receive the signaling containing information about flow rates from sensorless converters in zone circulators in heating/cooling zones controlled by temperature sensors in a hydronic heating system in order to derive an adaptive pressure set point to meet the flow rates requested by the heating/cooling zones using an adaptive system and flow control curve equation, the signaling received also containing information about total flow rates requested by the zone circulators, consistent with that disclosed herein.

Moreover, the signal processor or processing module 10a may be configured, e.g., by a person skilled in the art without undue experimentation, to determine desired pump speeds for the zone circulators to meet temperature requirements in heat zones, based upon the signaling received, consistent with that disclosed herein.

The scope of the invention is not intended to be limited to any particular implementation using technology either now known or later developed in the future. The scope of the invention is intended to include implementing the functionality of the processors 10a as stand-alone processor, signal processor, or signal processor module, as well as separate processor or processor modules, as well as some combination thereof.

The apparatus 10 may also include, e.g., other signal processor circuits or components 10b, including random access memory or memory module (RAM) and/or read only memory (ROM), input/output devices and control, and data and address buses connecting the same, and/or at least one input processor and at least one output processor, e.g., which would be appreciate by a person skilled in the art.

Various Points of Novelty

The present invention may also include, or take the form of, one or more of the following various embodiments:

For example, according to some embodiments the present invention may take the form of, or may be implemented as, a system and flow adaptive pump control means or technique for a hydronic pumping system may include an adaptive pump control curves equation based upon the moving maximum system flow rate requested from zones as well as the moving average equivalent hydronic system characteristics curve. In operation, the pressure set point from the system and flow adaptive control curve equations for pump speed PID controls is much closer to the system pressure needed to provide the flow rate requested in system, so that the pumping operation energy may be saved.

According to some embodiments, the present invention may be implemented using one preferred version of the system and flow adaptive pump control means or technique for a hydronic pumping system may include the system and flow adaptive pump control equations means which are defined as Eq. 2.1 or Eq. 2.2, with which the adaptive pressure or flow set point may be derived based upon the moving maximum system flow rate requested by zones defined by Eqs. 2.3-2.4 as well as the moving average system characteristics curve, and shown schematically in FIG. 2.

According to some embodiments, the present invention may be implemented using one preferred version of the system and flow adaptive pump control means for a hydronic pumping system may include a minimum pumping energy operation system configuration integrated with sensors or sensorless converters means as shown schematically in FIG. 3. The minimum pumping energy operation system may be achieved with minimum pressure $b_0$ is set to be zero and the control curve parameter $\alpha$ is set to be quadratic in Eq. 2.1. The pump speed may then be determined through a PID function of Eq. 3.1.

According to some embodiments, the present invention may be implemented using one preferred version of the minimum pumping energy operation system configuration integrated with sensors or sensorless converters means as shown schematically in FIG. 2, e.g., that may include a flow follower PID control by Eq. 3.2 as well, where $Q^*$ is the system flow set point defined by Eq. 2.2 with an instant system pressure signal monitored or derived directly for the multiple zones flow signals by Eqs. 2.3 and 2.4, respectively, Q is the instant system flow rate at motor speed of n. Equation 3.2 may define a flow follower PID pump speed control, in which the system flow rate follows the total flow rate requested to meet the heating or cooling requirement at zones, respectively.

According to some embodiments, the present invention may be implemented using one preferred version of the sensorless converters means or technique for a hydronic pumping system, e.g., that may include a sensorless convertor based upon pump motor operation readings which yields the system pressure and flow rate, which may be used for the system and flow adaptive pump control curve means. The sensorless convertor means or technique can be a discrete calibration modeling means or theoretical modeling ones as set forth in the aforementioned references [3] to [6].

According to some embodiments, the present invention may be implemented using the minimum pumping energy operation systems that may include close-loop hydronic systems or open loop hydronic systems, as in primary pumping, secondary pumping, water circulating, or pressure booster. The systems mentioned here may consist of a single zone or multiple zones.

According to some embodiments, the present invention may be implemented using the control and signals generating and monitoring transmitting and wiring technologies may include all conventional sensing and transmitting means that are used currently. Preferably, wireless signals transmission technologies or communication protocol may be provided as optimal and favorable solutions.

According to some embodiments, the present invention may be implemented using the pumps mentioned herein for hydronic pumping systems may include a single pump, a circulator, a group of parallel ganged pumps or circulators, a group of serial ganged pumps or circulators, or their combinations.

According to some embodiments, the present invention may be implemented using the systems flow regulation, e.g., that may include manual or automatic control valves, manual or automatic control circulators, or their combinations.

The aforementioned implementations are provided by way of example, and the scope of the invention is intended to include other types or kinds of implementations consistent with that disclosed herein within the spirit of the present invention.

The Equations

The aforementioned equations for implementing the present invention are provided by way of example. The scope of the invention is intended to include using other types or kinds of equations that are now known or later developed in the future, as well as variations of the aforementioned equations, all within the spirit of the present invention.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the present invention is described by way of example in relation to a centrifugal pump, the scope of the invention is intended to include using the same in relation to other types or kinds of pumps either now known or later developed in the future.

Although the invention has been described and illustrated with respect to exemplary embodiments thereof, the foregoing and various other additions and omissions may be made therein and thereto without departing from the spirit and scope of the present invention.

What we claim is:

1. Apparatus comprising:
  a signal processor or processing module configured at least to:
    receive signaling containing information about flow rates from sensorless converters in zone circulators in heating/cooling zones controlled by temperature sensors in a hydronic heating system in order to derive an adaptive pressure set point to meet the flow rates requested by the heating/cooling zones using an adaptive system and flow control curve equation, the signaling received also containing information about total flow rates requested by the zone circulators;
    determine corresponding signaling containing information about desired pump speeds for the zone circulators to meet temperature requirements in heat zones, based upon the signaling received;
    determine an adaptive pump control curve equation based upon an adaptive system curve and as a moving maximum system flow rate that depends on a relationship between an adaptive pressure set point, a system flow rate requested by temperature loads, a minimum pressure at no flow, a control curve setting parameter, and an adaptive moving maximum flow and pressure; and
    determine 1) the adaptive pump control curve equation based upon the adaptive system curve and as the moving maximum system flow rate using an equation (2.1), as follows:

$$P^*(t) = \left(\frac{Q^*(t)}{\overline{Q}_m(t)}\right)^\alpha (\overline{P}_m(t) - b_0) + b_0, \quad (2.1)$$

where $P^*(t)$ represents the adaptive pressure set point, $Q^*(t)$ is the system flow rate requested by the temperature loads, $b_0$ is the minimum pressure at no flow, $\alpha$ is the control curve setting parameter varying as $1 \leq \alpha \leq 2$ defined in between a linear curve and a quadratic one, and $\overline{Q}_m(t)$ and $\overline{P}_m(t)$ are the adaptive moving maximum flow and pressure; or 2) a flow signal for use in a flow PID control technique based upon a flow set point in a control function using an equation (2.2), as follows:

$$Q^*(t) = \left(\frac{P^*(t) - b_0}{P_0 - b_0}\right)^{-\alpha} \overline{Q}_m(t), \quad (2.2)$$

including where the signal processor or processing module is configured to receive the instant
pressure signal of $P^*(t)$ from a pressure sensor;
wherein a pump controller controls speed of a pump according to the determined adaptive pump control curve equation.

2. Apparatus according to claim 1, wherein the signal processor or processing module is configured to provide the corresponding signaling containing information about the desired pump speeds as a control signal.

3. Apparatus according to claim 2, wherein the corresponding signaling contains information used to control a pumping hydronic system.

4. Apparatus according to claim 1, wherein the signal processor or processing module is configured in, or forms part of, a central pump control panel.

5. Apparatus according to claim 1, wherein the zone circulators include sensors for providing the flow rates.

6. Apparatus according to claim 1, wherein the signal processor or processing module is configured to receive associated signaling containing information about the system flow rate of $Q^*(t)$ or the pressure of $P^*(t)$ from a flow meter or the pressure sensor, or a sensorless converter, respectively.

7. Apparatus according to claim 1, wherein, for a multiple zones application, the signal processor or processing module is configured to determine the system flow rate of $Q^*(t)$ as a summation of zone flow rates, respectively, using an equation (2.3), as follows:

$$Q^*(t) = \sum_{i=1}^{n} Q_i^*(t), \quad (2.3)$$

where $Q_i^*(t)$ is a flow rate at zone i, and n is a total numbers of zones, including where the signal processor or processing module is configured to receive the associated signaling containing information about the system flow rate of $Q_i^*(t)$ or the pressure of $P^*(t)$ from a flow meter or the pressure sensor, or a sensorless converter in zone i, respectively.

8. Apparatus according to claim 1, wherein the signal processor or processing module is configured to determine associated signaling related to the adaptive moving maximum flow of $\overline{Q}_m$ by a moving average or a moving peak detector upon the system flow of Q using an equation (2.4), as follows:

$$\overline{Q}_m(t) = \begin{cases} MA(Q(t)) \vee MP(Q(t)), & Q < \overline{Q}_m \\ Q(t), & Q \geq \overline{Q}_m \end{cases}, \quad (2.4)$$

where the function $MA(Q(t))$ represents a moving average detector and the function $MP(Q(t))$ represents a moving peak detector respectively.

9. Apparatus according to claim 8, wherein the signal processor or processing module is configured to determine associated signaling containing information about $\overline{P}_m(t)$ by using a flow equation, as follows:

$$\overline{P}_m = (\overline{Q}_m/\overline{C}_v)^2,$$

including where the signal processor or processing module is configured to determine the associated signaling containing information about an adaptive system characteristics coefficient of $\overline{C}_v$ using equivalent system characteristics coefficient of $C_v$ by using the moving average or maximum detector defined in the equation (2.4) accordingly.

10. Apparatus according to claim 1, wherein the parameters $\overline{Q}_m$ and $\overline{P}_m$ vary within ranges of $0 < \overline{Q}_m < \overline{Q}_d$ and $b_0 < \overline{P}_m < \overline{P}_d$, including where the adaptive system characteristics coefficient of $\overline{C}_v$ is a constant value of $C_v$, if the system flow is regulated by circulators.

11. Apparatus according to claim 1, wherein the signal processor or processing module is configured to determine associated signaling containing information about a design point or duty point of the system flow and pressure of $\overline{Q}_d$ and $\overline{P}_d$, where the system curve may run through a pump curve at a speed designed, using equations (2.5), as follows:

$$\begin{cases} \overline{Q}_d(n_d, \overline{C}_v) = \frac{n_d}{2n_{max}}\left(-b \pm \sqrt{b^2 - 4c(a - \overline{C}_v^{-2})}\right)/(a - \overline{C}_v^{-2}) \\ \overline{P}_d(n_d, \overline{C}_v) = \left(\frac{\overline{Q}_d}{\overline{C}_v}\right)^2 \end{cases}, \quad (2.5)$$

where a, b and c are coefficients of a second order best-fit pump curve function, $n_d$ and $n_{max}$ are pump speeds at the design point and an associated maximum respectively.

12. Apparatus according to claim 1, wherein the signal processor or processing module is configured to determine associated signaling containing information about a PID function for motor speed of ra with respect to an instant system pressure and the adaptive pressure set point using an equation (3.1), as follows:

$$n(t) = pid(P^*(t), P(t)), \quad (3.1)$$

where $P^*(t)$ is the adaptive pressure set point defined by the equation (2.1), $P(t)$ is an instant system pressure, and pid represents a PID control function.

13. Apparatus according to claim 11, wherein the signal processor or processing module is configured to determine associated signaling for a flow follower PID control to achieve a minimum pumping energy operation using an equation (3.2), as follows:

$$n(t) = pid(Q^*(t), Q(t)), \quad (3.2)$$

where Q*(t) is the system flow set point determined using equation (2.2) with an instant system pressure signal or determined directly for the multiple zones flow signals using equation (2.3), respectively, Q(t) is the instant system flow rate at motor speed of n.

14. Apparatus according to claim 1, wherein the apparatus comprises system and flow adaptive sensorless pumping control apparatus.

15. A method comprising:
receiving with a signal processor or processing module signaling containing information about flow rates from sensorless converters in zone circulators in heating/cooling zones controlled by temperature sensors in a hydronic heating system in order to derive an adaptive pressure set point to meet the flow rates requested by the heating/cooling zones using an adaptive system and flow control curve equation, the signaling received also containing information about total flow rates requested by the zone circulators;
determining with the signal processor or processing module corresponding signaling containing information about desired pump speeds for the zone circulators to meet temperature requirements in heat zones, based upon the signaling received;
determining with the signal processor or processing module an adaptive pump control curve equation based upon an adaptive system curve and as a moving maximum system flow rate that depends on a relationship between an adaptive pressure set point, a system flow rate requested by temperature loads, a minimum pressure at no flow, a control curve setting parameter, and an adaptive moving maximum flow and pressure; and
determining with the signal processor or processing module:
1) the adaptive pump control curve equation based upon the adaptive system curve and as the moving maximum system flow rate using an equation (2.1), as follows:

$$P^*(t) = \left(\frac{Q^*(t)}{\overline{Q}_m(t)}\right)^\alpha (\overline{P}_m(t) - b_0) + b_0, \qquad (2.1)$$

where P*(t) represents the adaptive pressure set point, Q*(t) is the system flow rate requested by the temperature loads, $b_0$ is the minimum pressure at no flow, α is the control curve setting parameter varying as $1 \le \alpha \le 2$ defined in between a linear curve and a quadratic one, and $\overline{Q}_m(t)$ and $\overline{P}_m(t)$ are the adaptive moving maximum flow and pressure; or 2) a flow signal for use in a flow PID control technique based upon a flow set point in a control function using an equation (2.2), as follows:

$$Q^*(t) = \left(\frac{P^*(t) - b_0}{P_0 - b_0}\right)^{-\alpha} \overline{Q}_m(t), \qquad (2.2)$$

including where the signal processor or processing module is configured to receive the instant pressure signal of P*(t) from a pressure sensor;
Controlling speed of a pump with a pump controller according to the determined adaptive pump control curve equation.

16. A method according to claim 15, wherein the method comprises providing from the signal processor or processing module the corresponding signaling containing information about the desired pump speeds.

17. A method according to claim 16, wherein the corresponding signaling contains information used to control a pumping hydronic system.

18. A method according to claim 15, wherein the method comprises configuring the signal processor or processing module in, or forming the signal processor or processing module as part of, a central pump control panel.

19. A method according to claim 15, wherein the method comprises configuring the zone circulators with sensors for providing the flow rates.

* * * * *